United States Patent
Matsumoto (10) Patent No.: US 7,755,567 B2
(45) Date of Patent: Jul. 13, 2010

(54) IMAGE DISPLAY APPARATUS, IMAGE SIGNAL PROCESSING METHOD, PROGRAM FOR IMPLEMENTING THE METHOD, AND STORAGE MEDIUM STORING THE PROGRAM

(75) Inventor: Toshiyuki Matsumoto, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1311 days.

(21) Appl. No.: 11/145,556

(22) Filed: Jun. 3, 2005

(65) Prior Publication Data

US 2005/0280629 A1 Dec. 22, 2005

(30) Foreign Application Priority Data

Jun. 3, 2004 (JP) .............................. 2004-166332

(51) Int. Cl.
*G09G 5/00* (2006.01)
(52) U.S. Cl. ...................... 345/1.3; 345/1.2; 348/222.1; 348/259; 348/333.06; 455/566
(58) Field of Classification Search ........... 345/1.1–1.3, 345/103; 445/566, 575.1–575.4; 348/222.1, 348/223.1, 259, 333.06, 333.11
See application file for complete search history.

(56) References Cited

U.S. PATENT DOCUMENTS

| 7,151,911 | B2 * | 12/2006 | Matsumoto | ................ 455/90.2 |
| 7,346,376 | B2 * | 3/2008 | Hamamura et al. | ....... 455/575.3 |
| 2006/0229116 | A1 * | 10/2006 | Ishihara et al. | ........... 455/575.3 |

FOREIGN PATENT DOCUMENTS

JP          5-94156  A         4/1993

\* cited by examiner

*Primary Examiner*—Henry N Tran
(74) *Attorney, Agent, or Firm*—Rossi, Kimms & McDowell LLP

(57) ABSTRACT

An image display apparatus which is capable of optimizing the image quality of a plurality of display devices having different optical characteristics when carrying out processing of an image signal supplied to the display devices, without providing a dedicated display driving circuit for each display device. The image display apparatus comprises a plurality of liquid crystal display panels (10, 11) having different optical characteristics. A liquid crystal driving circuit (2) processes an image signal outputted to the liquid crystal display panels (10, 11). Operative states of the liquid crystal display panels (10, 11) are detected. At least one processing characteristic of the liquid crystal driving circuit (2) is changed according to the detected operative states.

12 Claims, 5 Drawing Sheets

| | CONTRAST | BRIGHTNESS | GAMMA |
|---|---|---|---|
| FIRST CONTROL DATA | A1 | B1 | C1 |
| SECOND CONTROL DATA | A2 | B2 | C2 |
| THIRD CONTROL DATA | A3 | B3 | C3 |
| FOURTH CONTROL DATA | A4 | B4 | C4 |
| FIFTH CONTROL DATA | A5 | B5 | C5 |

IMAGE DISPLAY APPARATUS, IMAGE SIGNAL PROCESSING METHOD, PROGRAM FOR IMPLEMENTING THE METHOD, AND STORAGE MEDIUM STORING THE PROGRAM

BACKGROUND OF THE INVENTION

1. Field of the Invention

The present invention relates to an image display apparatus, and an image signal processing method, which carry out processing of an image signal supplied to a plurality of display devices having different optical characteristics, using a common display driving circuit, and a program for implementing the method, and a storage medium storing the program.

2. Description of the Related Art

Conventionally, there has been known a liquid crystal display apparatus which, when carrying out brightness adjustment of an image signal, can realize sufficient gradation displays, even if the amplitude of the image signal is reduced. Further, there has been known a camera integrated-type VTR provided with a direct view-type liquid crystal display panel and a finder view-type liquid crystal display panel. With this camera integrated-type VTR, a method is employed in which the two display panels are each driven by a dedicated driving circuit. This is due to the fact that optical characteristics such as gamma, brightness, contrast, and white balance, differ according to the type of liquid crystal display panel, and thus, an independent driving system must be provided for each type.

Figure 5:
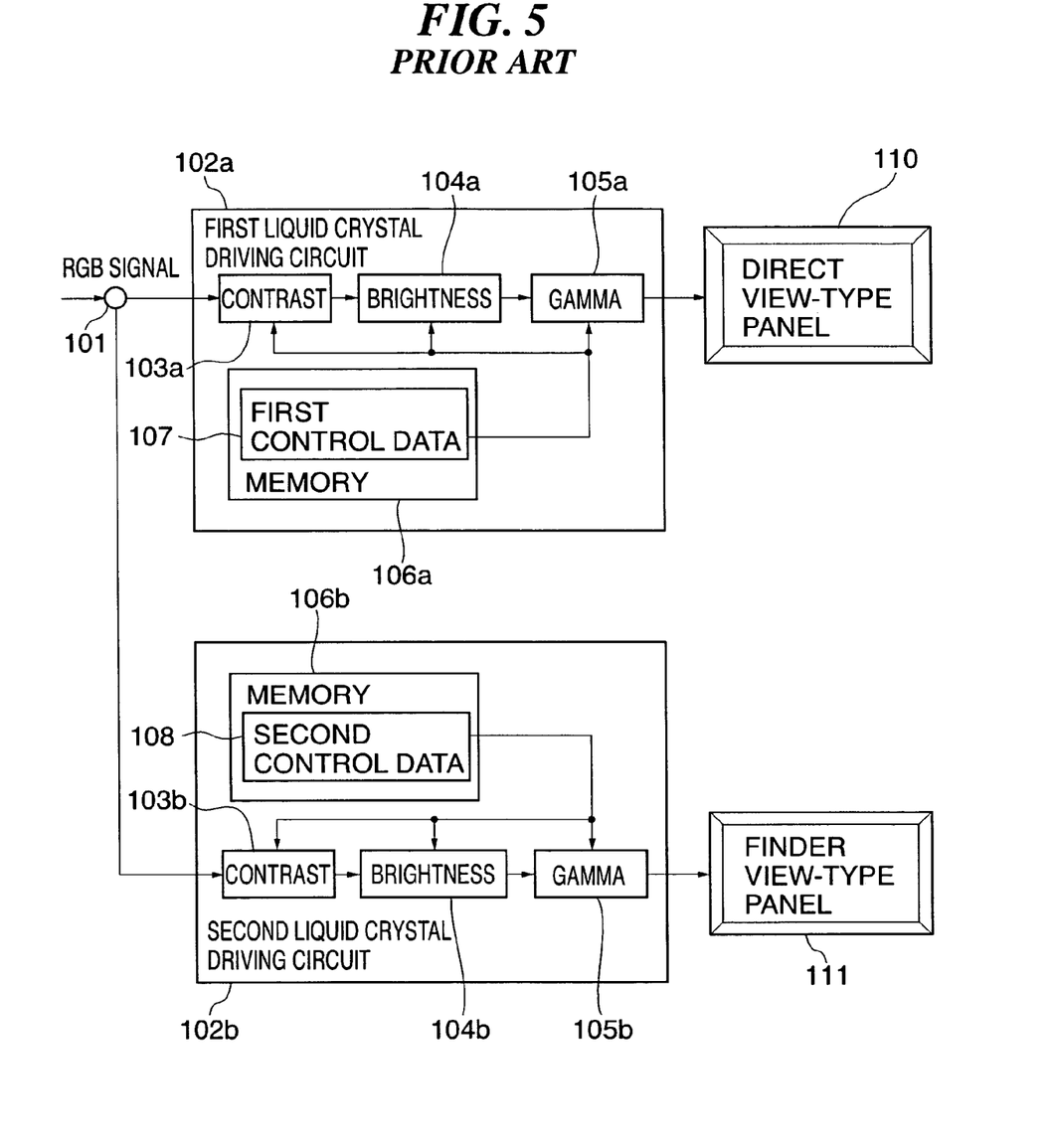
FIG. 5 is a block diagram schematically showing the electrical configuration of a conventional liquid crystal display apparatus.

FIG. 5 is a block diagram schematically showing the electrical configuration of a conventional liquid crystal display apparatus. This liquid crystal display apparatus is comprised of a direct view-type liquid crystal display panel 110, a first liquid crystal driving circuit 102a that drives the direct view-type liquid crystal display panel 110, a finder view-type liquid crystal display panel 111, and a second liquid crystal driving circuit 102b that drives the finder view-type liquid crystal display panel 111.

The first liquid crystal driving circuit 102a includes a contrast adjusting circuit 103a that adjusts the amplitude of an image signal, a brightness adjusting circuit 104a that adjusts setup levels of the image signal, a gamma adjusting circuit 105a that adjusts gamma characteristics of the image signal, and a memory 106a. The second liquid crystal driving circuit 102b includes a contrast adjusting circuit 103b that adjusts the amplitude of the image signal, a brightness adjusting circuit 104b that adjusts setup levels of the image signal, a gamma adjusting circuit 105b that adjusts gamma characteristics of the image signal, and a memory 106b.

With the image display apparatus having the above configuration, when an image signal that has been converted to the RGB format by a decoder, not shown, is inputted via an input terminal 101, the image signal is supplied to the first liquid crystal driving circuit 102a, where signal processing is carried out on the image signal by the contrast adjusting circuit 103a, the brightness adjusting circuit 104a, the gamma adjusting circuit 105a, an inversion circuit, not shown, etc., and then the processed image signal is supplied to the direct view-type liquid crystal display panel 110, whereby an image is displayed. At this time, adjustment values for carrying out the above signal processing are set to the contrast adjusting circuit 103a, the brightness adjusting circuit 104a, and the gamma adjusting circuit 105a, based on first control data 107 that is stored in the memory 106a.

Further, the image signal that is inputted via the input terminal 101 is simultaneously supplied to the second liquid crystal driving circuit 102b. After signal processing is carried out on the image signal by the contrast adjusting circuit 103b, the brightness adjusting circuit 104b, the gamma adjusting circuit 105b, an inversion circuit, not shown, etc., the image signal is supplied to the finder-type liquid crystal display panel 111, whereby an image is displayed. At this time, adjustment values for carrying out the above signal processing are set to the contrast adjusting circuit 103b, the brightness adjusting circuit 104b, and the gamma adjusting circuit 105b, based on second control data 108 that is stored in the memory 106b.

In this way, with the conventional image display apparatus, it is possible to set optimum settings for the direct view-type liquid crystal display panel and for the finder-type liquid crystal display panel.

However, with the above conventional image display apparatus, further improvements are demanded in the following points. That is, the provision of two sets of liquid crystal driving circuits on the image display apparatus is disadvantageous in terms of the area for mounting component parts, power consumption, and cost, and thus, it is difficult to provide an apparatus having a small size, reduced power consumption, and a low cost.

Further, when a plurality of liquid crystal panels such as a direct view-type liquid crystal display panel, and a finder view-type liquid crystal display panel, are employed in a camera integrated-type VTR, since the optical characteristics of the liquid crystal panels differ, the optimum set values of brightness, contrast, gamma, and the like, differ between the liquid crystal panels. In addition, in recent years, white light emitting diodes (hereinafter referred to as "white LEDs") are used as a light source for backlight for liquid crystal displays. However, the white LEDs have large variations in chromaticity due to their characteristics. Conventionally, such variations are corrected on the liquid crystal panels by providing offset for the setup of R, G, B image signals. Therefore, even if the optical characteristics of the direct view-type liquid crystal display panel and the finder view-type liquid crystal display panel were the same, if the chromaticity of the backlight that is combined differs, the optimum set values for image signals become different between the liquid crystal panels.

As mentioned above, if these two liquid crystal display panels are driven by respective dedicated driving circuits, it is possible to supply an optimum image signal for each liquid crystal display panel. However, in this case, two sets of liquid crystal driving circuits are used, which is disadvantageous in terms of the area for mounting component parts, power consumption, and cost, and thus, it is difficult to provide an apparatus having a small size, reduced power consumption, and a low cost.

On the other hand, if the two liquid crystal panels are driven by a single driving circuit, optimum image signals cannot be supplied to both of the liquid crystal display panels, and there arises a problem that the image quality of either one of the display panels becomes degraded.

SUMMARY OF THE INVENTION

It is an object of the present invention to provide an image display apparatus and an image signal processing method which are capable of optimizing the image quality of a plurality of display devices having different optical characteristics when carrying out processing of an image signal supplied to the display devices, without providing a dedicated display driving unit for each display device, and a program for implementing the method and a storage medium storing the program.

To attain the above object, in a first aspect of the present invention there is provided an image display apparatus comprising a plurality of display devices having different optical characteristics, a display driving unit that processes an image signal outputted to the plurality of display devices, a detecting unit that detects operative states of the plurality of display devices, and a changing unit that changes at least one processing characteristic of the display driving unit according to the detected operative states.

According to the first aspect of the present invention, when processing of an image signal supplied to the plurality of display devices having different optical characteristics is carried out using a common display driving unit, operative states of the plurality of display devices are detected, and processing characteristics of the display driving unit are changed according to the detected operative states. Therefore, when carrying out processing of an image signal supplied to the plurality of display devices having different optical characteristics, it is possible to optimize the image quality of the display devices without providing a dedicated display driving unit for each display device. As a result, it is possible to reduce the area for mounting component parts, power consumption and costs.

Preferably, the changing unit comprises a setting value holding unit that holds a plurality of setting values which determine the processing characteristic of the display driving unit, and a selecting unit that selects one of the held plurality of setting values according to the detected operative states, and the changing unit changes the processing characteristic of the display driving unit by setting the selected setting value to the display driving unit.

According to this construction, it is possible to easily change the processing characteristics of the display driving unit.

Preferably, the detecting unit comprises an open-close detecting unit that detects an open-close state of a predetermined one of the display devices, and changes the processing characteristic of the display driving unit based on the detected open-close state.

Alternatively, the detecting unit comprises a rotation detecting unit that detects a rotational state of a predetermined one of the display devices, and changes the processing characteristic of the display driving unit based on the detected rotational state.

Preferably, the detecting unit comprises an open-close detecting unit that detects an open-close state of a predetermined one of the display devices, a rotation detecting unit that detects a rotational state of the predetermined display device, and a control unit that controls display operations of the display devices based on the detected open-close state and rotational state.

According to this construction, the processing characteristic of the display driving unit can be automatically changed according to the open-close state and the rotational state of the display devices.

More preferably, the image display apparatus comprises a switching unit that switches an image quality-prioritizing in which priority is given to image quality of an image to be displayed on one of the plurality of display devices, and the changing unit comprises a second selecting unit that selects a setting value from the setting values held by the setting value holding unit, according to the switching of the switching unit.

According to this construction, the image quality can be adjusted as desired according to the user's intention.

Preferably, the processing characteristic of the display driving unit that is changed by the changing unit comprises at least one characteristic selected from the group consisting of brightness, contrast, gamma, and white balance of the image signal.

Preferably, the plurality of display devices comprise a first display device, and a second device, and the plurality of setting values comprise at least two setting values selected from the group consisting of a first setting value that is most suitable for optical characteristics of the first display device, a second setting value that is most suitable for optical characteristics of the second display device, and a third setting value that is an approximately middle value of the first and second setting values.

According to this construction, whether only the first display device is driven, or only the second display device is driven, or both the first and the second display devices are driven, or either one is driven, it is possible to set the adjustment values to values for obtaining suitable image quality.

More preferably, the plurality of setting values further comprise at least one setting value selected from the group consisting of a fourth setting value that is closer to the first setting value with respect to the approximately middle value, and a fifth setting value that is closer to the second setting value with respect to the approximately middle value.

According to this construction, when the first and second display devices are driven simultaneously, or either one is driven, it is possible to give priority to the image quality of the first display device or the second display device.

More preferably, the first display device is provided on the image display apparatus such that it can be freely opened and closed and can be freely rotated relative to the image display apparatus, and the second display device is fixed to the image display apparatus, and the image display apparatus further comprises a control unit that controls display operations of the first display device and the second display device, based on an open-close state and a rotational state of the first display device.

According to this construction, the image quality of the first and second display devices can be suitably set according to the open-close state and the rotational state of the first display device.

More preferably, the plurality of display devices comprise liquid crystal display panels.

To attain the above object, in a second aspect of the present invention, there is provided an image signal processing method of processing an image signal supplied to a plurality of display devices having different optical characteristics, using a display driving unit, comprising a detecting step of detecting operative states of the plurality of display devices, and a changing step of changing at least one processing characteristic of the display driving unit according to the detected operative states.

To attain the above object, in a third aspect of the present invention, there is provided a program for causing a computer to execute an image signal processing method of processing an image signal supplied to a plurality of display devices having different optical characteristics, using a display driving unit, comprising a detecting module for detecting operative states of the plurality of display devices, and a changing module for changing at least one processing characteristic of the display driving unit according to the detected operative states.

To attain the above object, in a fourth aspect of the present invention, there is provided a computer-readable storage medium storing a program for causing a computer to execute an image signal processing method of processing an image signal supplied to a plurality of display devices having different optical characteristics, using a display driving unit, the program comprising a detecting module for detecting operative states of the plurality of display devices, and a changing module for changing at least one processing characteristic of the display driving unit according to the detected operative states.

The above and other objects, features, and advantages of the present invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
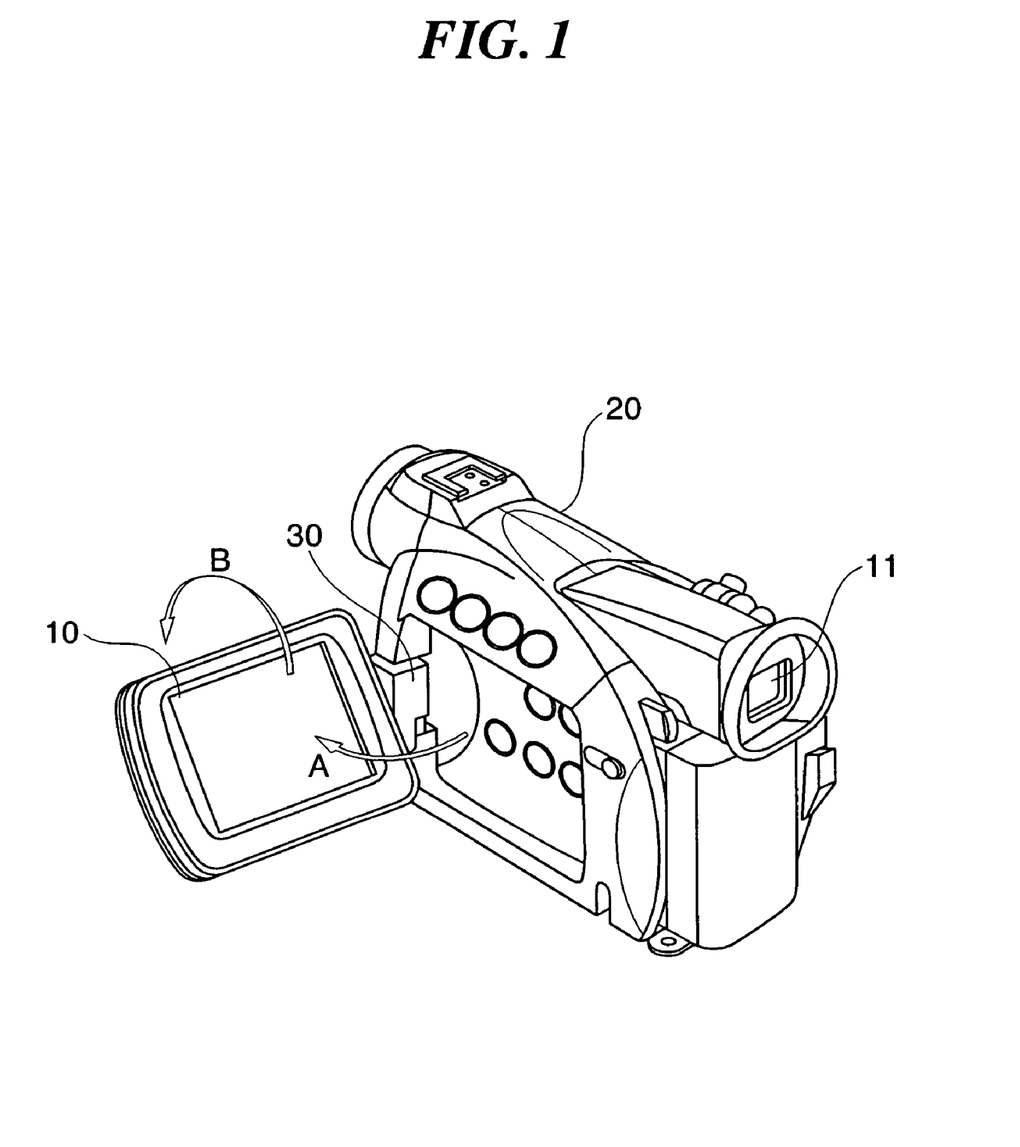
FIG. 1 is a perspective view showing the appearance of a camera integrated-type VTR including an image display apparatus according to an embodiment of the present invention.

FIG. 1 is a perspective view showing the appearance of a camera integrated-type VTR including an image display apparatus according to an embodiment of the present invention. The camera integrated-type VTR 20 has a direct view-type liquid crystal display panel 10 provided on a side surface of the main body thereof, and a finder view-type liquid crystal display panel 11 provided on a back surface of the main body thereof. The direct view-type liquid crystal display panel 10 can be freely opened and closed in a direction indicated by the arrow A and can be freely rotated in a direction indicated by the arrow B, about a hinge section 30 relative to the main body of the camera integrated-type VTR 20.

Figure 2:
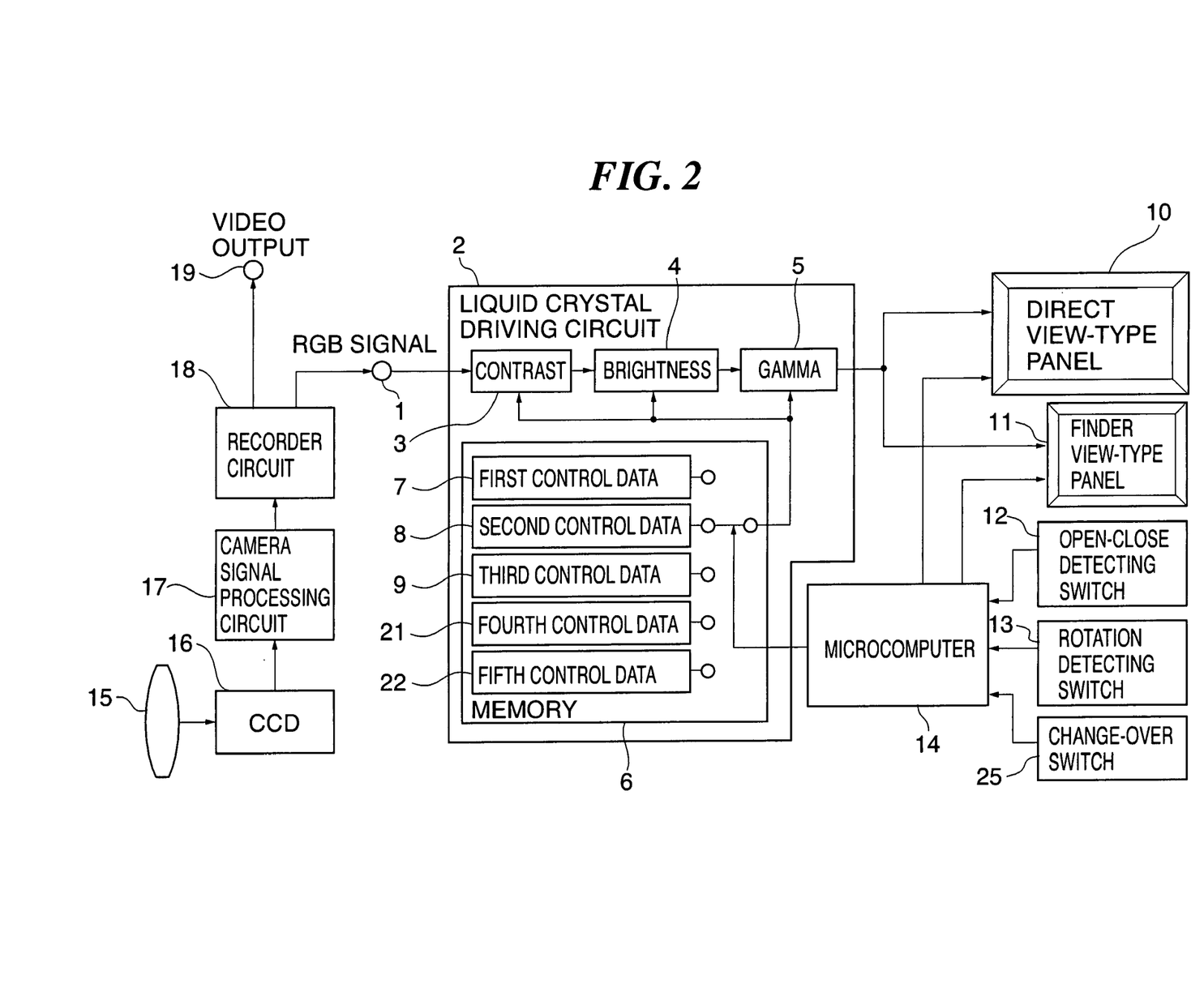
FIG. 2 is a block diagram schematically showing the electrical configuration of the camera integrated-type VTR.

FIG. 2 is a block diagram schematically showing the electrical configuration of the camera integrated-type VTR 20.

As shown in FIG. 2, the camera integrated-type VTR 20 is comprised of a lens 15, a CCD 16, a camera signal processing circuit 17, a recorder circuit 18, a liquid crystal driving circuit 2, a microcomputer 14, the direct view-type liquid crystal display panel 10, and the finder view-type liquid crystal display panel 11. Connected to the microcomputer 14 are the following: an open-close detecting switch (SW) 12 that detects an open-close state of the direct view-type liquid crystal display panel 10; a rotation detecting switch (SW) 13 that detects the rotational state of the direct view-type liquid crystal display panel 10; and a change-over switch (SW) 25 that gives priority to either the direct view-type liquid crystal display panel 10 or the finder view-type liquid crystal display panel 11 so as to display one of the display panels with higher image quality. The liquid crystal driving circuit 2 is comprised of a contrast adjusting circuit 3 that adjusts the amplitude of an image signal, a brightness adjusting circuit 4 that adjusts setup levels of the image signal, a gamma adjusting circuit 5 that adjusts gamma characteristics of the image signal, and an inversion circuit, not shown, a memory 6. First control data 7, second control data 8, third control data 9, fourth control data 21, and fifth control data 22 are stored in the memory 6.

Figure 3:
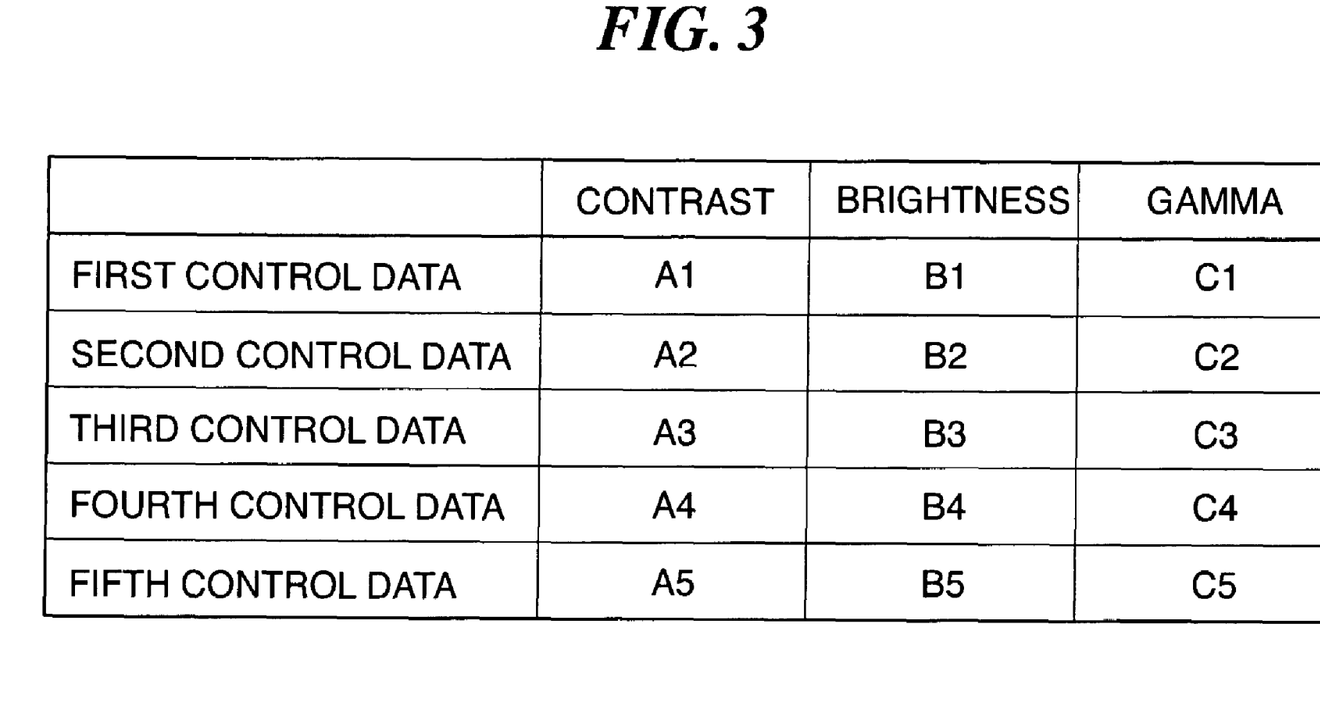
FIG. 3 is a view showing a table showing adjustment values for control data in a memory appearing in FIG. 2.

FIG. 3 is a view showing a table showing adjustment values for the control data in the memory 6 shown in FIG. 2. In FIG. 3, the adjustment values of contrast, brightness, and gamma of the first control data 7 are set such that the values are most suitable for optical characteristics of the direct view-type liquid crystal display panel 10. In the first control data 7, the adjustment values of contrast, brightness, and gamma are set to values A1, B1, and C1, respectively. The adjustment values of contrast, brightness, and gamma of the second control data 8 are set such that the values are most suitable for optical characteristics of the finder view-type liquid crystal display panel 11. In the second control data 8, the adjustment values of contrast, brightness, and gamma are set to values A2, B2, and C2, respectively.

The adjustment values of contrast, brightness, and gamma of the third control data 9 are each set to a value that is an approximately middle value of the corresponding adjustment values of the first and second control data which are set so as to obtain optimum image quality for both the direct view-type liquid crystal display panel 10 and the finder view-type liquid crystal display panel 11. In the third control data 9, the adjustment values of contrast, brightness, and gamma are set to values A3, B3, and C3, respectively. The adjustment values A3, B3, and C3, are calculated based on the adjustment values A1, B1, and C1 set in the first control data 7, and the adjustment values A2, B2, and C2 set in the second control data 8, according to the following formula (1).

$$A3 \approx \tfrac{1}{2}(A1+A2)$$

$$B3 \approx \tfrac{1}{2}(B1+B2)$$

$$C3 \approx \tfrac{1}{2}(C1+C2) \qquad (1)$$

The adjustment values of contrast, brightness, and gamma of the fourth control data 21 are each set to a value that is closer to a value that obtains optimum image quality for the direct view-type liquid crystal display panel 10 with respect to the approximately middle value of the corresponding adjustment values of the first and second control data which are set so as to obtain optimum image qualities for both the direct view-type liquid crystal display panel 10 and the finder view-type liquid crystal display panel 11. In the fourth control data 21, the adjustment values of contrast, brightness, and gamma are set to values A4, B4, and C4, respectively. The adjustment values A4, B4, and C4 are calculated based on the adjustment values A1, B1, and C1 set in the first control data 7, and the adjustment values A2, B2, and C2 set in the second control data 8, according to the following formula (2).

$$A1 < A4 < \tfrac{1}{2}(A1+A2)$$

$$B1 < B4 < \tfrac{1}{2}(B1+B2)$$

$$C1 < C4 < \tfrac{1}{2}(C1+C2) \qquad (2)$$

The adjustment values of contrast, brightness, and gamma of the fifth control data 22 are each set to a value that is closer to a value that obtains optimum image quality for the finder view-type liquid crystal display panel 11 with respect to the approximately middle value of the corresponding adjustment values of the first and second control data which are set so as to obtain optimum image qualities for both the direct view-type liquid crystal display panel 10 and the finder view-type liquid crystal display panel 11. In the fifth control data 22, the adjustment values of contrast, brightness, and gamma are set to values A5, B5, and C5, respectively. The adjustment values A5, B5, and C5, are calculated based on the adjustment values A1, B1, and C1 set in the first control data 7, and the adjustment values A2, B2, and C2 set in the second control data 8, according to the following formula (3).

$$½(A1+A2)<A5<A2$$

$$½(B1+B2)<B5<B2$$

$$½(C1+C2)<C5<C2 \quad (3)$$

Next, the operation of the camera integrated-type VTR 20 constructed as above will be described.

First, an optical image of a subject that is inputted via the lens 15 is formed on the CCD 16, and is photoelectrically converted into an electrical signal by the CCD 16. The electrical signal is supplied to the camera signal processing circuit 17. The image signal is image processed by the camera signal processing circuit 17 and supplied to the recorder circuit 18. After being subjected to signal processing by the recorder circuit 18, the image signal is stored in a storage medium by a recorder, not shown. At the same time, the image signal (RGB signal) from the recorder circuit 18 is outputted to an external apparatus via a video output terminal 19 and to the liquid crystal driving circuit 2 via the input terminal 1.

The image signal which is outputted to the liquid crystal driving circuit 2 via the input terminal 1 is subjected to signal processing by the contrast adjusting circuit 3, the brightness adjusting circuit 4, the gamma adjusting circuit 5, the inversion circuit, not shown, etc. Then, the processed image signal is outputted to the direct view-type liquid crystal display panel 10 and the finder view-type liquid crystal display panel 11, and thus, an image is displayed on the direct view-type liquid crystal display panel 10 and the finder view-type liquid crystal display panel 11.

Here, the adjustment values are set in the contrast adjusting circuit 3, the brightness adjusting circuit 4, and the gamma adjusting circuit 5, based on the first control data 7, or the second control data 8, or the third control data 9, which are stored in the memory 6.

As stated before, the direct view-type liquid crystal display panel 10 can be freely opened and closed and also can be freely rotated about the hinge section 30, and the open-close state is detected by the open-close detecting switch 13, and the rotational state is detected by the rotation detecting switch 13. The results of these detections are supplied to the microcomputer 14. Based on the detection results, the microcomputer 14 controls the selection as to whether the image is to be displayed only on the direct view-type liquid crystal display panel 10, or only on the finder view-type liquid crystal display panel 11, or on both the direct view-type liquid crystal display panel 10 and the finder view-type liquid crystal display panel 11. The microcomputer 14 controls the memory 6 so that, if the image is to be display only on the direct view-type liquid crystal display panel 10, the first control data 7 is selected, if the image is to be display only on the finder view-type liquid crystal display panel 11, the second control data 8 is selected, and if the image is to be displayed on both the direct view-type liquid crystal display panel 10 and the finder view-type liquid crystal display panel 11, the third control data 9 is selected. Based on the selected control data, the adjustment values of the contrast adjusting circuit 3, the brightness adjusting circuit 4, and the gamma adjusting circuit 5 are set.

When the image is to be displayed on both the direct view-type liquid crystal display panel 10 and the finder view-type liquid crystal display panel 11, the fourth control data 21 may be used as an alternative to the third control data 9. In this case, the VTR 20 enters an image quality-prioritizing mode in which priority is given to the image quality of the direct view-type liquid crystal display panel 10. Similarly, the fifth control data 22 may be used as an alternative to the third control data 9. In this case, the VTR 20 enters an image quality-prioritizing mode in which priority is given to the image quality of the finder view-type liquid crystal display panel 11. The user can switch these image quality-prioritizing modes by operating the change-over switch 25.

Figure 4:
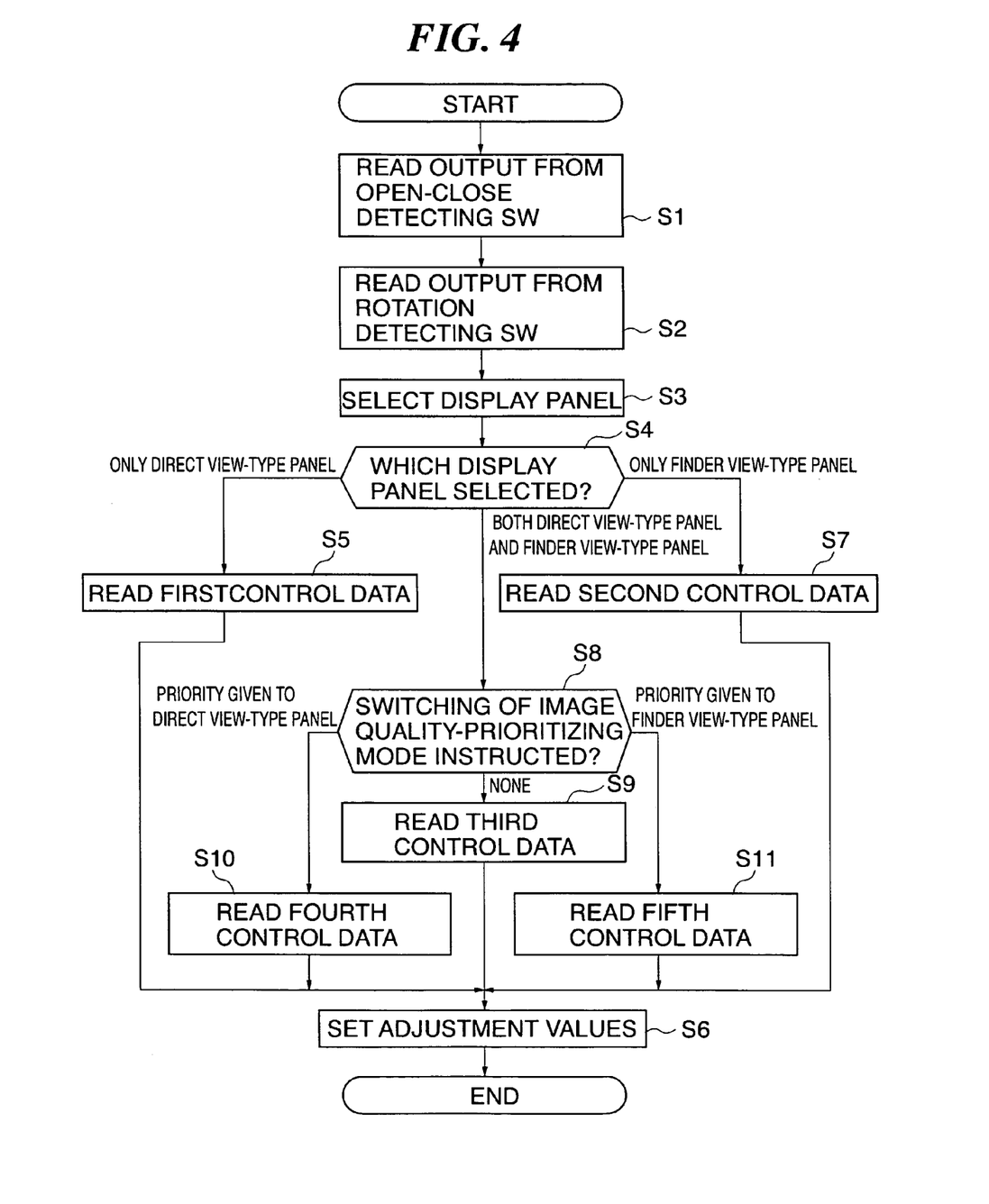
FIG. 4 is a flowchart showing the procedure of a process for setting adjustment values for a contrast adjusting circuit, a brightness adjusting circuit, and a gamma adjusting circuit.

FIG. 4 is a flowchart showing the procedure of the procedure of a process for setting the adjustment values for the contrast adjusting circuit 3, the brightness adjusting circuit 4, and the gamma adjusting circuit 5. The program for carrying out this process is stored in a ROM, not shown, within the microcomputer 14, and is executed by a CPU, not shown, within the microcomputer 14.

First, the states of the open-close detecting switch 12 and the rotation detecting switch 13 are read (steps S1 and S2). Based on the read states of the open-close detecting switch 12 and the rotation detecting switch 13, the display panel on which the image is to be displayed, is selected (step S3). Here, the selection of the display panel is carried out such that the image is displayed in the following manner. That is, if the direct view-type liquid crystal display panel 10 is in a state such that it has been opened in the direction indicated by the arrow A (refer to FIG. 1), the image is displayed only on the direct view-type liquid crystal display panel 10, and is not displayed on the finder view-type liquid crystal display panel 11. If the direct view-type liquid crystal display panel 10 is rotated from the state of FIG. 1 in the direction indicated by the arrow B, and the display screen is faced toward the subject, the image is displayed on the direct view-type liquid crystal display panel 10, and at the same time, is displayed on the finder view-type liquid crystal display panel 11. Further, if the display surface of the direct view-type liquid crystal display panel 10 is stored with the display screen facing the main body of the camera integrated-type VTR 20, the image is displayed only on the finder view-type liquid crystal display panel 11 and is not displayed on the direct view-type liquid crystal display panel 10.

Next, the selected crystal display panel is determined (step S4). If it is determined that only the direct view-type liquid crystal display panel 10 has been selected, the first control data 7 which is most suitable for the optical characteristics of the direct view-type liquid crystal display panel 10 is read (step S5), and using this first control data 7, the adjustment values A1, B1, C1 for the contrast adjusting circuit 3, the brightness adjusting circuit 4, and the gamma adjusting circuit 5 are set respectively (step S6), followed by termination of the process.

If it is determined in the step S4 that only the finder view-type liquid crystal display panel 11 has been selected, the second control data 8 is read (step S7), and using this second control data 8, the adjustment values A2, B2, C2 for the contrast adjusting circuit 3, the brightness adjusting circuit 4, and the gamma adjusting circuit 5 are set respectively in a step S6, followed by termination of the process.

If it is determined in the step S4 that both the direct view-type liquid crystal display panel 10 and the finder view-type liquid crystal display panel 11 have been selected, it is determined whether the user has instructed switching of the image quality-prioritizing mode by operating the change-over switch 25 (step S8). If switching of the image quality-prioritizing mode has not been instructed by the user, the third control data 9 is read (step S9), and using this third control data 9, the adjustment values A3, B3, C3 for the contrast adjusting circuit 3, the brightness adjusting circuit 4, and the gamma adjusting circuit 5 are set respectively (step S6), followed by termination of the process.

On the other hand, if switching of the image quality-prioritizing mode has been instructed by the user in the step S8 and priority is given to the direct view-type liquid crystal display panel 10, the fourth control data 21 is read (step S10), and using this fourth control data 21, the adjustment values A4, B4, C4 for the contrast adjusting circuit 3, the brightness adjusting circuit 4, and the gamma adjusting circuit 5 are set respectively (step S6), followed by termination of the process. If, in the step S8, an instruction has been given to give priority to the finder view-type liquid crystal display panel 11, the fifth control data 22 is read (step S11), and using this fifth control data 22, the adjustment values A5, B5, C5 for the contrast adjusting circuit 3, the brightness adjusting circuit 4, and the gamma adjusting circuit 5 are set respectively (step S6), followed by termination of the process.

As described above, according to the present embodiment, when processing an image signal supplied to the direct view-type liquid crystal display panel 10 and the finder view-type liquid crystal display panel 11, it is possible to optimize the image quality of the liquid crystal panels without providing liquid crystal driving circuits dedicated to the respective display panels. As a result, it is possible to reduce the area for mounting component parts, power consumption and costs.

That is, when the microcomputer 14 drives only the direct view-type liquid crystal display panel 10, the liquid crystal driving circuit 2 is controlled using a combination of adjustment values (combination of adjustment values of control signals for adjusting brightness, contrast, and gamma) most suitable for the optical characteristics of the direct view-type liquid crystal display panel 10, and when the microcomputer 14 drives only the finder view-type liquid crystal display panel 11, the liquid crystal driving circuit 2 is controlled using a combination of adjustment values most suitable for the optical characteristics of the finder view-type liquid crystal display panel 11. Thus, when either one of the liquid crystal display panels, i.e. the direct view-type liquid crystal display panel 10 or the finder view-type liquid crystal display panel 11, is selected, it is possible to drive the liquid crystal display panel with the most suitable image quality for the selected panel.

Further, when both the direct view-type liquid crystal display panel 10 and the finder view-type liquid crystal display panel 11 are driven simultaneously, the liquid crystal driving circuit 2 is controlled using a combination of adjustment values which are set to approximately middle values of the adjustment values set for the direct view-type liquid crystal display panel 10 and the adjustment values set for the finder view-type liquid crystal display panel 11. Thus, it is possible to display an image that is not degraded in quality, on each liquid crystal display panel. Further, when an image is displayed simultaneously on the two liquid crystal display panels, it is possible to give priority to the image quality of the direct view-type liquid crystal display panel 10 or give priority to the image quality of the finder view-type liquid crystal display panel 11, by switching the image quality-prioritizing mode.

While the embodiment of the present invention has been described above, the present invention is not limited to the configuration of the embodiment, and may be realized in any configuration that can achieve the functions exhibited by the configuration of the embodiment.

For example, the present embodiment shows a case where two liquid crystal display panels are provided. However, three or more liquid crystal display panels may be provided. Further, in the present embodiment, the display operation is controlled according to the open-close state and the rotational state of the liquid crystal display panel. However, it is possible to control the display operation of the liquid crystal display panel according to the operative state of either the open-close state or the rotational state. Further, it is possible to select control data that is suitable for optical characteristics of the liquid crystal display panels according to either the open-close state or the rotational state. Moreover, in the present embodiment, contrast, brightness, and gamma are used as the adjustment values for optical characteristics of the liquid crystal display panels. However, adjustment values other than these adjustment values, for example, white balance, may be used. Further, adjustment values of contrast, brightness, and gamma that are set according to a user's preference for one or both liquid crystal display panels may be stored as sixth control data in the memory or the like.

Further, although in the present embodiment liquid crystal display panels are used as display devices, it is possible to use organic EL displays, plasma displays or the like.

It is to be understood that the object of the present invention may be also accomplished by supplying an image display apparatus with a storage medium in which a program code of software, which realizes the functions of the above described embodiment, is stored, and causing a computer (or CPU or MPU) of the apparatus to read out and execute the program code stored in the storage medium.

In this case, the program code itself read from the storage medium realizes the functions of the above described embodiment, and hence the program code and the storage medium in which the program code is stored constitute the present invention.

Examples of the storage medium for supplying the program code is not limited to a ROM or the like, but may be, for example, a memory card such as a compact flash (registered trademark).

CROSS REFERENCE TO RELATED APPLICATION

This application claims priority from Japanese Patent Application No. 2004-166332 filed Jun. 3, 2004, which is hereby incorporated by reference herein.

What is claimed is:

1. An image display apparatus comprising:
a plurality of display devices having different optical characteristics;
a display driving unit that processes an image signal outputted to said plurality of display devices;
a detecting unit that detects operative states of said plurality of display devices; and
a changing unit that changes at least one processing characteristic of said display driving unit according to the detected operative states,
wherein said plurality of display devices comprise a first display device and a second device, and
wherein the processing characteristic is determined by a plurality of setting values, and the plurality of setting values comprise at least two setting values selected from the group consisting of a first setting value that is most suitable for optical characteristics of the first display device, a second setting value that is most suitable for optical characteristics of the second display device, and a third setting value that is an approximately middle value of the first and second setting values.

2. An image display apparatus as claimed in claim 1, wherein:

said changing unit comprises a setting value holding unit that holds the plurality of setting values, and a selecting unit that selects one of the held plurality of setting values according to the detected operative states; and said changing unit changes the processing characteristic of said display driving unit by setting the selected setting value to said display driving unit.

3. An image display apparatus as claimed in claim 2, further comprising a switching unit that switches an image quality-prioritizing in which priority is given to image quality of an image to be displayed on one of said plurality of display devices, wherein said changing unit comprises a second selecting unit that selects a setting value from the setting values held by said setting value holding unit, according to the switching of said switching unit.

4. An image display apparatus as claimed in claim 1, wherein said detecting unit comprises a rotation detecting unit that detects a rotational state of a predetermined one of said display devices, and changes the processing characteristic of said display driving unit based on the detected rotational state.

5. An image display apparatus as claimed in claim 1, wherein said detecting unit comprises an open-close detecting unit that detects an open-close state of a predetermined one of said display devices, a rotation detecting unit that detects a rotational state of said predetermined display device, and a control unit that controls display operations of said display devices based on the detected open-close state and rotational state.

6. An image display apparatus as claimed in claim 1, wherein said detecting unit comprises an open-close detecting unit that detects an open-close state of a predetermined one of said display devices, and changes the processing characteristic of said display driving unit based on the detected open-close state.

7. An image display apparatus as claimed in claim 1, wherein the processing characteristic of said display driving unit that is changed by said changing unit comprises at least one characteristic selected from the group consisting of brightness, contrast, gamma, and white balance of the image signal.

8. An image display apparatus as claimed in claim 1, wherein said plurality of display devices comprise liquid crystal display panels.

9. An image display apparatus as claimed in claim 1, wherein the plurality of setting values further comprise at least one setting value selected from the group consisting of a fourth setting value that is closer to the first setting value with respect to the approximately middle value, and a fifth setting value that is closer to the second setting value with respect to the approximately middle value.

10. An image display apparatus as claimed in claim 1, wherein:

the first display device is provided on the image display apparatus such that it can be freely opened and closed and can be freely rotated relative to the image display apparatus, and the second display device is fixed to the image display apparatus; and the image display apparatus further comprises a control unit that controls display operations of the first display device and the second display device, based on an open-close state and a rotational state of the first display device.

11. An image signal processing method of processing an image signal supplied to a plurality of display devices having different optical characteristics, using a display driving unit, the method comprising:

a detecting step of detecting operative states of the plurality of display devices; and a changing step of changing at least one processing characteristic of the display driving unit according to the detected operative states, wherein the plurality of display devices comprise a first display device and a second device, and wherein the processing characteristic is determined by a plurality of setting values, and the plurality of setting values comprise at least two setting values selected from the group consisting of a first setting value that is most suitable for optical characteristics of the first display device, a second setting value that is most suitable for optical characteristics of the second display device, and a third setting value that is an approximately middle value of the first and second setting values.

12. A computer-readable storage medium storing a program for causing a computer to execute an image signal processing method of processing an image signal supplied to a plurality of display devices having different optical characteristics, using a display driving unit, the program comprising:

a detecting module for detecting operative states of the plurality of display devices; and a changing module for changing at least one processing characteristic of the display driving unit according to the detected operative states, wherein the plurality of display devices comprise a first display device and a second device, and wherein the processing characteristic is determined by a plurality of setting values, and the plurality of setting values comprise at least two setting values selected from the group consisting of a first setting value that is most suitable for optical characteristics of the first display device, a second setting value that is most suitable for optical characteristics of the second display device, and a third setting value that is an approximately middle value of the first and second setting values.

* * * * *